United States Patent [19]

Itoh et al.

[11] Patent Number: 6,103,142
[45] Date of Patent: Aug. 15, 2000

[54] PHOSPHOR AND DISPLAY DEVICE

[75] Inventors: Shigeo Itoh; Hitoshi Toki, both of Mobara, Japan

[73] Assignee: Futaba Denshi Kogyo K.K., Japan

[21] Appl. No.: 09/035,363

[22] Filed: Mar. 5, 1998

[30] Foreign Application Priority Data

Mar. 17, 1997 [JP] Japan ................................. 9-062797

[51] Int. Cl.$^7$ ........................... C09K 11/62; C09K 11/54
[52] U.S. Cl. ........................ 252/301.36; 252/301.16; 313/486; 313/503; 313/496; 428/403
[58] Field of Search ..................... 313/496, 497; 252/301.4 R, 301.4 H, 301.4 F, 301.4 S, 301.6 R, 301.6 F, 301.6 P, 301.6 S; 428/403, 367; 259/337

[56] References Cited

U.S. PATENT DOCUMENTS

| 3,125,418 | 3/1964 | Wentorf | 428/403 |
| 3,984,587 | 10/1976 | Lipp | 252/301.4 F |
| 4,129,519 | 12/1978 | Matsuzawa | 252/301.4 H |
| 4,754,140 | 6/1988 | Nam et al. | 250/337 |
| 4,791,336 | 12/1988 | Morimoto et al. | 252/301.4 R |
| 5,128,546 | 7/1992 | Nam et al. | 252/301.4 F |
| 5,619,098 | 4/1997 | Toki et al. | 313/496 |

*Primary Examiner*—Ashok Patel
*Attorney, Agent, or Firm*—Breiner & Breiner

[57] ABSTRACT

A phosphor capable of being reduced in activity of a surface thereof, to thereby minimize adsorption of gas thereon, release of gas therefrom and the like, to thereby ensure protection of the surface. The phosphor of the present invention is coated with a diamond-like carbon (DLC) film. Such coating reduces an activity of a surface of the phosphor. Also, the phosphor may be used for a display section of a display device. This permits durability of the phosphor to be increased and prevents a deterioration of a cathode, resulting in the display device being increased in durability.

3 Claims, 3 Drawing Sheets

PHOSPHOR AND DISPLAY DEVICE

BACKGROUND OF THE INVENTION

This invention relates to a phosphor, and more particularly to a phosphor having a diamond-like carbon film deposited thereon and a display device having such a phosphor incorporated therein.

A phosphor has been conventionally incorporated in various kinds of display devices. For example, a fluorescent display device includes an envelope which is kept at a high vacuum and in which electrodes such as phosphor-deposited anodes, electron emitting cathodes and the like are arranged so as to permit electrons emitted from the cathodes to be impinged on phosphor layers, leading to display of desired luminous colors. Such a fluorescent display device or the like has a variety of phosphors incorporated therein depending on a purpose thereof. Of such various phosphors, phosphors mainly consisting of elements belonging to Groups II–VI of the periodic table such as, for example, a phosphor mainly consisting of sulfide (sulfide phosphor), a phosphor mainly consisting of Sr (Sr phosphor), a phosphor mainly consisting of Y (Y phosphor) and the like exhibit an increased surface activity, to thereby cause gas remaining in the envelope such as $H_2$, $H_2O$, $O_2$ or $CO_2$ adhered to an inner surface of the envelope to be adsorbed on a surface of the phosphors, resulting in luminous efficiency of the phosphors by excitation due to impingement of electron beams thereon being deteriorated. In order to prevent such adsorption of gas on the surface of the phosphor and also protect the phosphor, it has been often carried out to coat a $SiO_2$ film on the surface of the phosphor. Such coating of the $SiO_2$ film is known in the art as a surface treatment for a phosphor used for, for example, a cathode ray tube or the like.

Unfortunately, Si in the form of a thin film is active, so that the SiO 2 film actually adsorbs gas thereon, resulting in failing to sufficiently protect the phosphor.

SUMMARY OF THE INVENTION

The present invention has been made in view of the foregoing disadvantage of the prior art.

Accordingly, it is an object of the present invention to provide a phosphor which is capable of being reduced in activity of a surface thereof, to thereby minimize adsorption of gas thereon, release of gas therefrom and the like, resulting in ensuring protection of the surface.

In accordance with one aspect of the present invention, a phosphor is provided. The phosphor is coated with a diamond-like carbon film (DLC film).

In a preferred embodiment of the present invention, the diamond-like carbon film is formed of hydrocarbon gas by CVD.

In a preferred embodiment of the present invention, the diamond-like carbon film has a thickness within a range of between 10 Å and 200 Å.

In a preferred embodiment of the present invention, the phosphor coated with a diamond-like carbon film has a particulate shape.

In a preferred embodiment of the present invention, the diamond-like carbon film formed on a surface of the phosphor is in the form of a laminar shape.

In a preferred embodiment of the present invention, the diamond-like carbon film has conductivity provided by doping of an impurity therein.

In a preferred embodiment of the present invention, the phosphor is selected from the group consisting of phosphors of Groups II–VI, II–IV–VI, III–IV–VI and III–V of the periodic table.

In accordance with another aspect of the present invention, a display device is provided which includes an envelope, anode conductors formed on an inner surface of the envelope, phosphors deposited on the anode conductors and an electron source arranged in the envelope. The phosphor is coated with a diamond-like carbon film.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENT

Now, the present invention will be described hereinafter with reference to the accompanying drawings.

The present invention is directed to a phosphor in the form of particles or a layer of which a surface is coated or covered with a diamond-like carbon (DLC) film. The DLC film may be formed by chemical vapor deposition (CVD) techniques using a heated filament, plasma CVD techniques using a microwave, combustion flame techniques, RF CVD techniques, CVD techniques using DC discharge, plasma CVD techniques in a magnetic field or the like.

CVD is adapted to feed a starting substance or gas containing elements for a target material to a reaction chamber, resulting in the target material being deposited in the form of a film on a substrate by a reaction in a gaseous phase or a chemical reaction on a surface of the substrate. Feeding of the starting substance to the reaction chamber is carried out while keeping it at a gaseous state when it is a gaseous compound or carried out after vaporization when it is a liquid compound increased in vapor pressure or a solid compound.

As described above, various kinds of CVD techniques may be used for this purpose. Suitable CVD techniques are selected depending on a starting substance to be used, a pressure of a reaction atmosphere, a means for promoting a reaction and the like.

For example, an organic solvent having a CH group such as, for example, $CH_3OH$, $(CH_3)CO$, benzene, toluene or the like may be used for the starting substance in the heated filament CVD techniques. CO, methane or the like diluted with a large amount of $H_2$ may be used in the plasma CVD techniques using a microwave.

Figure 6:
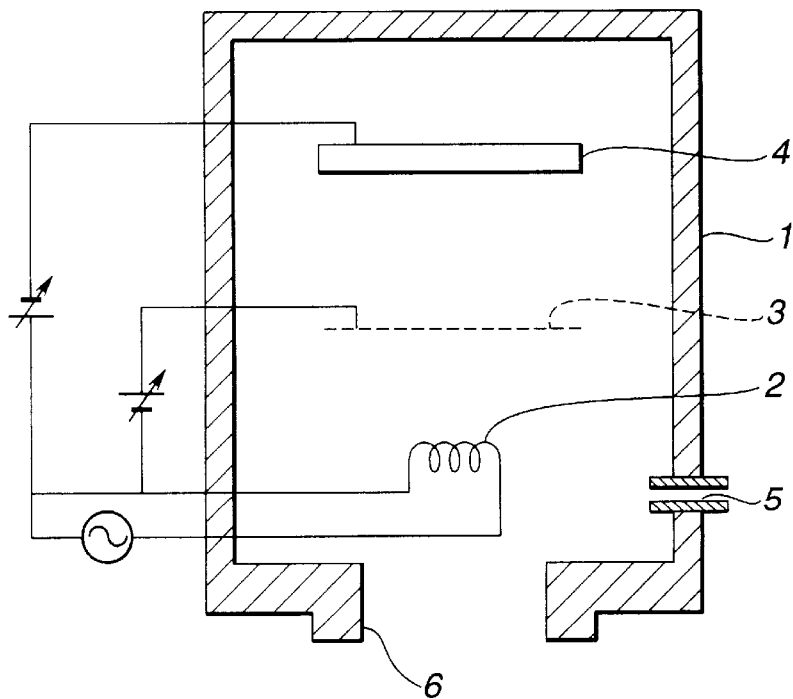
FIG. 6 is a schematic view showing an apparatus for forming a diamond-like carbon (DLC) film by CVD techniques by way of example.

For example, formation of the diamond-like carbon (DLC) film by the heated filament CVD techniques may be carried out by such an apparatus as shown in FIG. 6 by way of example. The apparatus shown in FIG. 6 includes a vacuum tank 1, in which a cathode 2, an anode 3 and a substrate 4 on which the DLC film is to be formed are arranged. The vacuum tank 1 has a gaseous starting substance introduced thereinto through a gas inlet port 5.

Reference numeral 6 designates a discharge port constructed in an openable manner.

In the apparatus thus constructed, a voltage is applied between the cathode 2 and the anode 3. This permits the cathode 2 to be sufficiently heated by resistance heating, resulting in thermions being emitted from the cathode 2 toward the anode 3. During the time, hydrocarbon introduced into the vacuum tank 1 is partially ionized by the thermions emitted from the cathode 2, to thereby form plasma. The hydrocarbon molecules thus ionized are accelerated toward the substrate 4 by a voltage applied to the substrate 4.

The DLC film exhibits a highly significant advantage with respect to a phosphor which has a relatively high surface activity sufficient to cause the phosphor to be deteriorated in quality due to adsorption of gas thereon or the like. By way of example, a phosphor mainly consisting of elements of Groups II–VI of the periodic table such as a sulfide phosphor, a Sr phosphor, a Y phosphor or the like will be described hereinafter. In the prior art, incorporation of such a phosphor in a fluorescent display device causes a deterioration in electron emission characteristics of the phosphor due to a deterioration in luminous efficiency of the phosphor or decomposition and scattering of the phosphor owing to adsorption of gas remaining in the envelope on the phosphor. On the contrary, the DLC film provided by the present invention eliminates the above-described disadvantage of the prior art.

The invention will be understood more readily appreciated with reference to the following examples; however, these examples are intended to illustrate the invention and are not to be construed to limit the scope of the invention.

EXAMPLE 1

$SrTiO_3$:Pr which is a phosphor of a red luminous color was coated on an indium tin oxide (ITO) electrode on an anode substrate by screen printing and then subject to calcination at 500° C. in air, resulting in the anode substrate coated with the phosphor being obtained. Then, a DLC film was formed on a surface of the phosphor by plasma CVD techniques while keeping the substrate at a temperature of 350° C., to thereby prepare a sample of the phosphor of the present invention having the DLC film deposited thereon (present sample). A thickness of the DLC film could be controlled depending on an input power of the plasma and a period of time for which formation of the DLC film is carried out. In the example, the input power was constantly kept at 300W, so that the thickness was controlled depending on the time. For comparison, the example was substantially repeated except that the film formation did not take place, to thereby prepare a sample of a comparative phosphor free from any film (first comparative sample). Also, the example was substantially repeated except that a $SiO_2$ film was formed in place of the DLC film according to substantially the same procedure as the example, to thereby prepare a sample of a comparative phosphor having the $SiO_2$ film deposited thereon (second comparative sample). Each of the present sample formed thereon with the DLC film, the first comparative sample free from any film and the second comparative sample formed thereon with the $SiO_2$ film was combined with a substrate formed thereon with a field emission cathode to construct a field emission display (FED), which was subject to a test for evaluating both initial characteristics thereof and a life thereof by applying a voltage of 400V to an anode thereof.

Now, a structure of the FED provided in the example will be described hereinafter. A transparent anode substrate made of a glass or the like is formed thereon with light-permeable anode conductors of indium tin oxide (ITO). The anode conductors each are formed with a phosphor layer. The phosphor layers each are coated thereon with such a DLC film constructed as described above.

The anode substrate is so arranged that an inner surface side thereof or a side of a surface thereof on which the phosphor layers are deposited is opposite to a cathode substrate with a predetermined interval being defined therebetween. The cathode substrate is formed on an inner surface thereof with field emission cathodes acting as an electron source. Also, a spacer member is arranged between the anode substrate and the cathode substrate while being positioned at an outer periphery thereof, resulting in an envelope being provided. The envelope thus provided is evacuated to a high vacuum.

A field emission cathode includes a cathode conductor formed on the cathode substrate, an insulating layer formed on the cathode conductor, a gate electrode formed on the insulating layer, and emitters of a conical shape each arranged in apertures formed in both insulating layer and gate electrode so as to commonly extend therethrough while being positioned on the cathode conductor.

Figure 1:
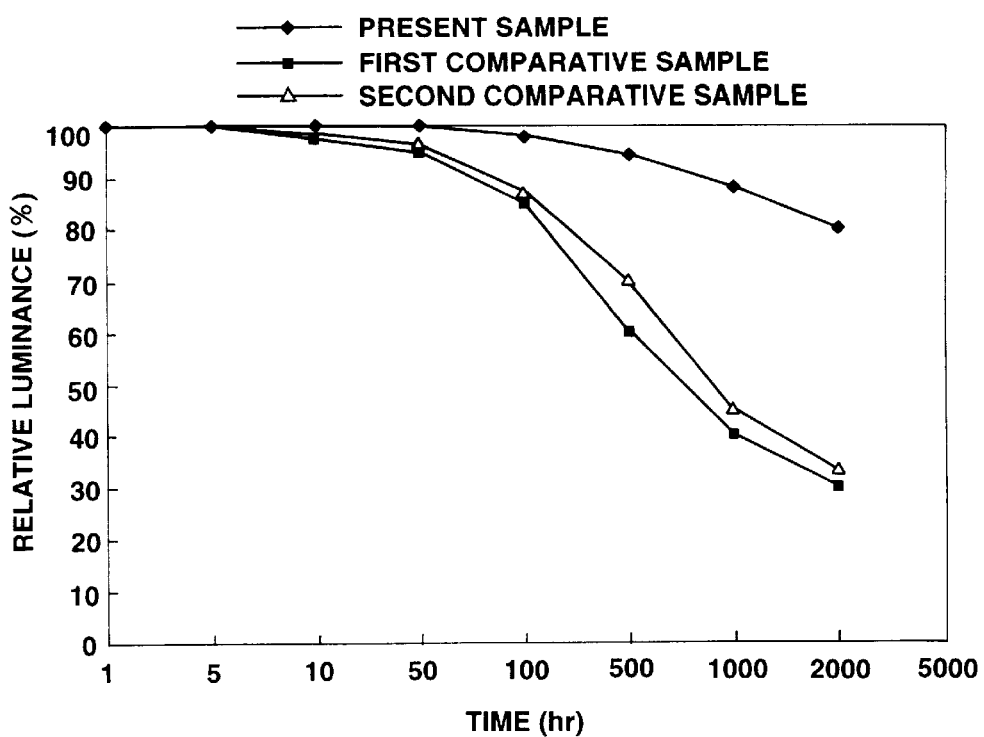
FIG. 1 is a graphical representation showing results of a life test carried out on both a sample of a phosphor of the present invention (present sample) and samples of comparative phosphors (comparative samples) which were obtained in Example 1.

FIG. 1 shows results of a life test carried out on the present sample having the DLC film of 20 Å in thickness deposited thereon, the first comparative sample free from any film and the second comparative sample having the $SiO_2$ film of 20 Å in thickness deposited which were obtained in Example 1. For example, after lighting time of 2000 hours elapsed, the first and second comparative samples each were reduced in relative luminance to a level of 30% based on initial luminance thereof, whereas the present sample had relative luminance kept at a level of 80% based on initial luminance thereof.

Figure 2:
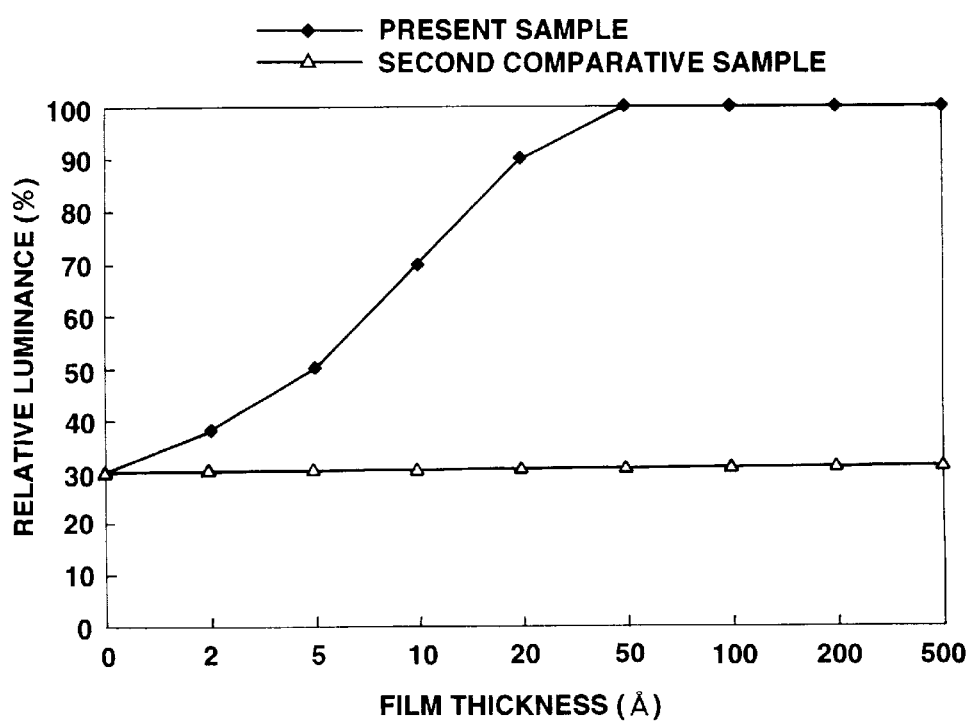
FIG. 2 is a graphical representation showing results of measurement of a thickness and luminance retention which was carried out on both the present sample and a sample of a comparative phosphor having the $SiO_2$ film deposited thereon (second comparative sample) which were obtained in Example 1.

FIG. 2 shows results of measurement of a thickness and luminance retention (1000 hours) which was carried out on the present sample and second comparative sample which were obtained in Example 1. The second comparative sample was reduced in luminance retention to a level of 30% irrespective of a thickness of the $SiO_2$ film. On the contrary, the present sample was increased in luminance retention with an increase in thickness of the DLC film. More specifically, the luminance retention was about 70% at the thickness of 10 Å and reached a saturation level at the thickness of 50 Å. This means that an increase in thickness of the DLC film to 50 Å permits the phosphor to exhibit luminance retention equal to initial luminance thereof even after lighting time of 1000 hours elapsed.

Figure 3:
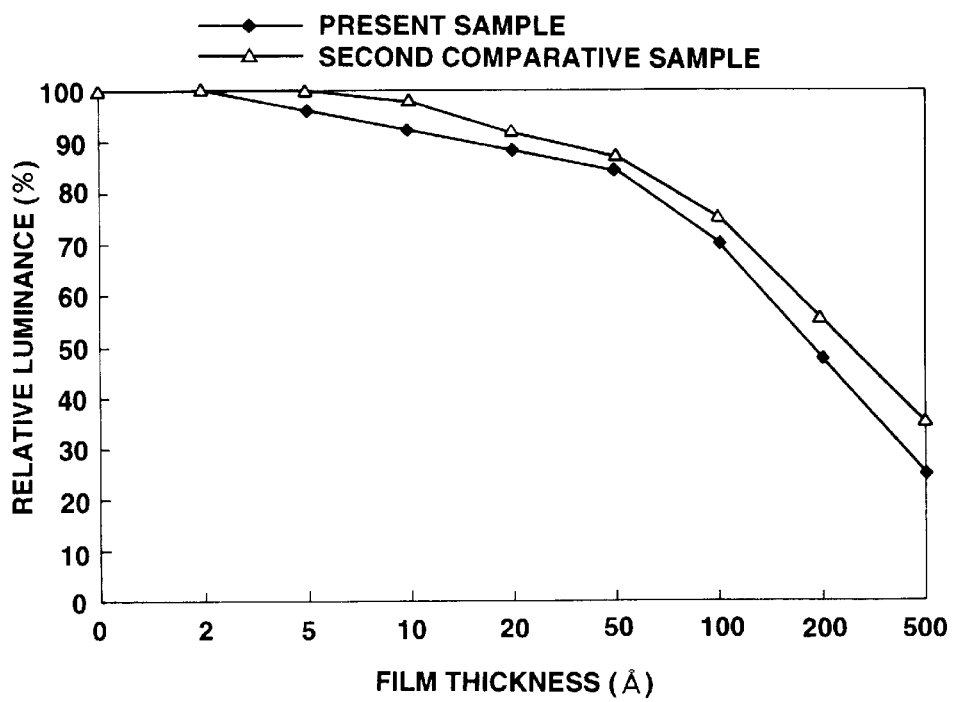
FIG. 3 is a graphical representation showing relationship between a thickness and initial luminance which was measured on both the present sample and second comparative sample which were obtained in Example 1.

FIG. 3 shows relationship between a thickness and initial luminance which was measured on the present sample and the second comparative sample coated with the SiO2 film which were obtained in Example 1. Supposing that initial luminance obtained when no film is coated is 100, both samples were reduced in initial luminance with an increase in thickness of the film. A degree at which initial luminance of the present sample was reduced was substantially identical with that of the second comparative sample. The reduction was about 75% at the thickness of 100 Å and about 55% at 200 Å.

Thus, it will be noted that coating of the phosphor with the DLC film in the present invention permits a life of the phosphor, luminous characteristics thereof and the like to be significantly improved. Synthetically judging from the foregoing, it would be concluded that the DLC film exhibits the above-described advantage when a thickness thereof is within a range of between 10 Å and 200 Å and preferably between 20 Å and 100 Å.

In general, an FED, a fluorescent display device or the like is constructed so as to apply an acceleration voltage of about 1 kV to electrons. Application of such an acceleration voltage to electrons permits the electrons to intrude into a phosphor by a distance as small as at most 1000 Å. This means that deposition of a film of 1000 Å or more in thickness on a phosphor keeps electrons from reaching a surface of the phosphor under application of the acceleration voltage. Thus, it will be noted that a thickness of the DLC film is preferably within the range described above also from such a point of view.

A surface of the phosphor of the present invention obtained in Example 1 which was formed thereon with the DLC film of 10 Å in thickness was subject to an AES analysis. As a result, it was found that the film contains C=90%, Sr=1.4%, Ti=1.3% and O=4.3%. This indicates that the phosphor was covered with the DLC film. Also, it was found that the FED in which the phosphor of the present invention obtained in the example is incorporated keeps the field emission cathode from being deteriorated. On the contrary, as a result that an FED having the second comparative sample coated with the $SiO_2$ film incorporated therein was subject to an AES analysis, a deterioration in both phosphor and field emission cathode was observed. An AES analysis of the field emission cathode revealed an increase in Ti, Si, C and the like.

The results of the AES analysis indicated that the present invention permits DLC to be formed into a uniform film of a reduced thickness sufficient to facilitate permeation of electrons therethrough while rendering the film highly stable. Also, it was found that coating of the phosphor with the DLC film ensures protection of the phosphor and prevents a deterioration in cathode acting as an electron source, so that the phosphor is suitable for use for a display device having a phosphor incorporated therein such as an FED, a fluorescent display device or the like. Further, it was found that the DLC film is inherently colored black, so that covering of the phosphor with the DLC film in the display device significantly improves contrast of the phosphor between lighting thereof and non-lighting thereof.

EXAMPLE 2

Example 1 described above was substantially repeated except that a $Y_2SiO_5$:Ce phosphor which exhibits a blue luminous color was used. In the example, a thickness of a DLC film was set to be 100 Å. This resulted in a sample of a DLC film coated phosphor of the present invention (present sample) being obtained. For comparison, a comparative phosphor sample free from any film (first comparative sample) was prepared.

Figure 4:
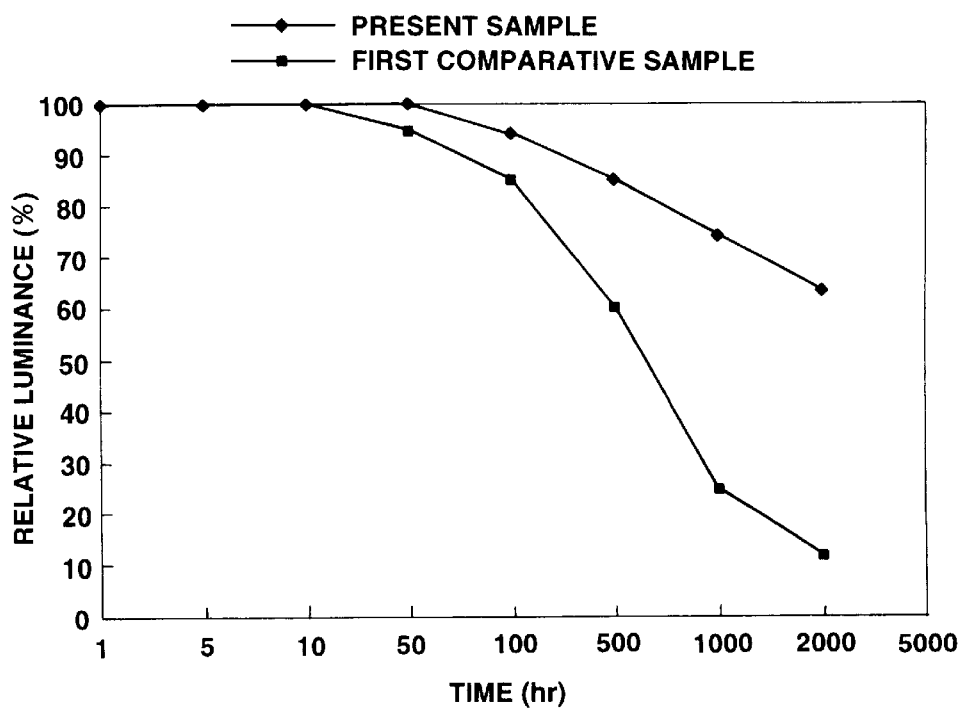
FIG. 4 is a graphical representation showing a variation in relative luminance to lighting time which was measured on both a present sample and a sample of a comparative phosphor free from any film (first comparative sample) which were obtained in Example 2.

FIG. 4 shows a variation in relative luminance to lighting time which was measured on both present sample and first comparative sample which were obtained in Example 2. As noted from FIG. 4, luminance retention of the present sample after lapse of 1000 hours was 75%, whereas that of the first comparative sample was as low as 25%. The results shown in FIG. 4 clearly indicate that DLC film contributes to stabilization of a surface of the phosphor, irrespective of the fact that the phosphor used in the example is generally said to be a phosphor which tends to readily adsorb moisture thereon.

EXAMPLE 3

Example 1 was substantially repeated except that a ZnS:Ag,Cl phosphor which exhibits a blue luminous color was used. In the example, a thickness of a DLC film was set to be 50 Å. This resulted in a sample of a DLC film coated phosphor of the present invention (present sample) being obtained. For comparison, a comparative phosphor sample free from any film (first comparative sample) was prepared.

Figure 5:
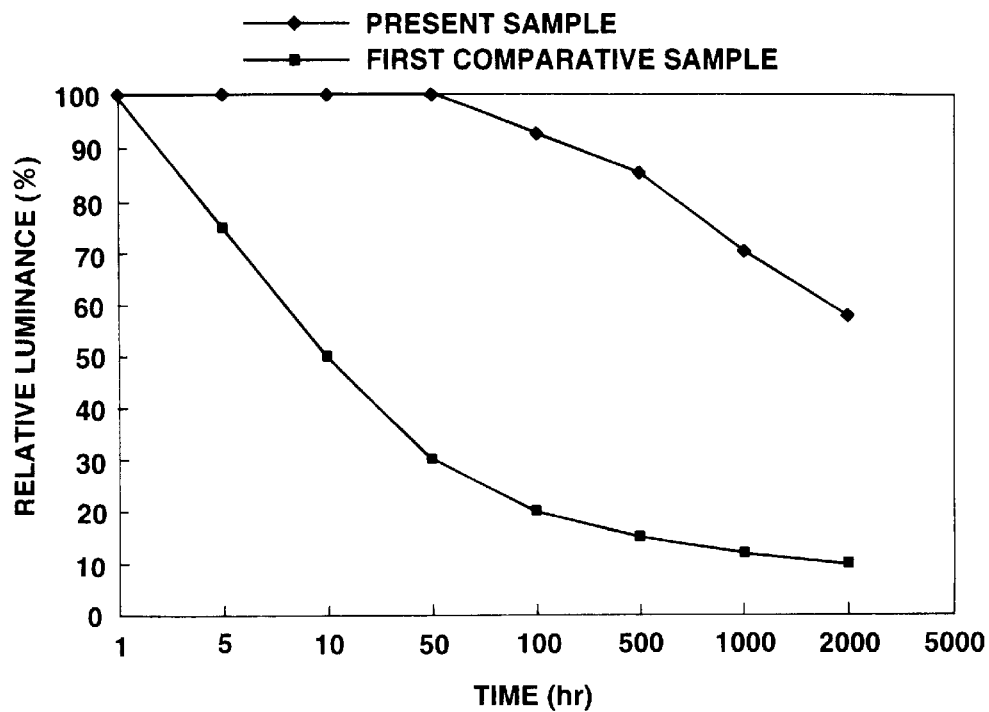
FIG. 5 is a graphical representation showing a variation in relative luminance to lighting time which was measured on both a present phosphor and a first comparative sample which were obtained in Example 3.

FIG. 5 shows a variation in relative luminance to lighting time which was measured on both present sample and first comparative sample which were obtained in Example 3. As noted from FIG. 5, luminance retention of the present sample after lapse of 1000 hours was 70%, whereas that of the first comparative sample was as low as 10%. The phosphor used for the present sample is expressed by a general formula $Zn_{1-x}Cd_xS$:A,B ($0 \geq x \geq 0.8$; A=Ag, Cu, Au or the like; B=Cl, Al or the like). It is known in the art that the phosphor is readily decomposed and scattered by gas remaining in an envelope of a display device or energy of electron beams. Field emission cathodes of FEDs in which the samples obtained in the example are respectively incorporated were subject to an SEA analysis. As a result, S was detected in an amount of 70% based on the total amount of elements detected from the field emission cathode having the first comparative sample incorporated, whereas the amount of S detected from the present sample was as low as about 5%. Thus, it was found that the DLC film contributes to stabilization of a surface of the phosphor. Therefore, it is clearly expected that the DLC film likewise exhibits such an advantageous function in all sulfide phosphors represented by $Zn_{1-x}Cd_xS$:A,B including the ZnS:Ag,Cl.

EXAMPLE 4

Example 1 was substantially repeated except that the DLC film was doped with N, B, P or the like during formation of the film, resulting in being provided with conductivity. $NH_3$, $B_2H_6$ or $BCl_3$, and $PH_3$ each were used as a material for the doping. Each of the materials or gases was mixed with a main material $CH_4$ while varying a volume ratio therebetween within a range of between 1:50 and 1:200. Then, the mixture was subject to film formation under conditions described hereinafter, resulting in a film of 50 Å being formed on each of phosphors. The results were as shown in Table 1.

TABLE 1

| Sample No. | Dopant | Doping Material/ Methane | Initial Luminance (Relative) | Retention (%) after 1000 hrs | Vth (V) |
|---|---|---|---|---|---|
| 1 | None | — | 85 | 100 | 50 |
| 2 | N | 1/50 | 90 | 100 | 20 |
| 3 | N | 1/100 | 92 | 100 | 16 |
| 4 | N | 1/200 | 87 | 100 | 30 |
| 5 | P | 1/100 | 90 | 100 | 18 |
| 6 | P | 1/50 | 87 | 100 | 23 |
| 7 | B | 1/100 | 87 | 100 | 28 |
| STD | — | — | 100 | 30 | 10 |

In Table 1, STD indicates a first comparative sample free from any film. Initial Luminance of each of the samples was calculated supposing that initial luminance of the first comparative sample STD is 100. Also, in Table 1, Vth indicates a voltage at which an anode current starts to flow through the phosphor layer. A decrease in Vth indicates a decrease in resistance of the phosphor layer. The $SrTiO_3$:Pr phosphor inherently has a small resistance, so that a Vth value thereof is as low as 10V as shown in Table 1. However, coating of the DLC film free from any dopant on the phosphor increased the Vth value to a level of 50V as seen in Sample No. 1 in Table 1. This means that the DLC layer increased a resistance of the phosphor layer. On the contrary, use of the dopant permitted the Vth value to be decreased and the initial luminance to be improved. This is for the reason that a voltage drop due to resistance of the phosphor layer is prevented. Further, Samples Nos. 1 to 6 wherein the phosphor was formed thereon with the DLC film each had luminance retention after 1000 hours identical with the initial luminance.

EXAMPLE 5

Example 2 was substantially repeated except that the DLC film was doped with N, B, P or the like during formation of the film. Results were as shown in Table 2.

TABLE 2

| Sample No. | Dopant | Doping Material/ Methane | Initial Luminance (Relative) | Retention (%) after 1000 hrs | Vth (V) |
|---|---|---|---|---|---|
| 1 | None | — | 71 | 75 | 150 |
| 2 | N | 1/50 | 83 | 77 | 82 |
| 3 | N | 1/100 | 85 | 79 | 80 |
| 4 | N | 1/200 | 78 | 76 | 90 |
| 5 | P | 1/100 | 90 | 79 | 85 |
| 6 | P | 1/50 | 84 | 78 | 90 |
| 7 | B | 1/100 | 87 | 76 | 85 |
| STD | — | — | 100 | 25 | 120 |

In Table 2, STD indicates a first comparative sample free from any film. Initial Luminance of each of the samples was calculated supposing that initial luminance of the first comparative sample STD is 100. The $Y_2SiO_5$:Ce phosphor inherently has a high resistance, so that a Vth value thereof is as high as 120V as shown in Table 2. Also, coating of the DLC film free from any dopant on phosphor increased the Vth value to a level of 150V as seen in Sample No. 1 in Table 2. This means that the DLC layer caused an increase in resistance of the phosphor layer. On the contrary, use of the dopant permitted the Vth value to be decreased and the initial luminance to be improved. A concentration of the dopant incorporated into the DLC film in each of the samples was measured by an SIMS analysis. As a result, it was found that a concentration of the dopant in the film was 0.07%, 0.04%, 0.015%, 0.05%, 0.09% and 0.10% in Samples Nos. 2, 3, 4, 5, 6 and 7, respectively. Thus, it will be noted that doping of an element for forming a donor or an acceptor in the DLC film into the DLC film permits a resistance of the DLC film to be decreased. Such doping is effective when a phosphor is relatively increased in resistance of a matrix thereof. In particular, it is applied to excitation under a low voltage.

The following is an example of conditions under which the DLC film:

Gas pressure: $3 \times 10^{-4}$ to $1 \times 10^{-3}$ Torr

Substrate voltage: 500 to 2000V

Anode voltage: 50 to 180V

Cathode current: 10 to 30A

The above description has been made in connection with the phosphor of Groups II–VI of the periodic table. However, the present invention is not limited to such a phosphor. It is effectively applicable to phosphors of Groups of II–IV–VI, III–IV–VI and III–V as well.

As can be seen from the foregoing, the phosphor of the present invention is coated with the DLC film. Such coating permits an activity of a surface of the phosphor to be significantly reduced, to thereby decrease adsorption of gas on the phosphor, release of gas therefrom or the like and protects the surface of the phosphor contributing to luminescence from an ambient atmosphere, to thereby improve durability of the phosphor. Also, use of the phosphor for a display section of a display device permits durability of the phosphor to be increased and prevents a deterioration of a cathode and the like, resulting in the display device being increased in durability. Further, the DLC film is inherently colored black, so that covering of the phosphor with the DLC film contributes to an improvement in contrast of the phosphor between lighting thereof and non-lighting thereof, to thereby increase display quality.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A phosphor coated with a diamond-like carbon film, wherein said diamond-like carbon film is formed of hydrocarbon gas by CVD.

2. A phosphor coated with a diamond-like carbon film, wherein said diamond-like carbon film has a thickness within a range of between 10 Å and 200 Å.

3. A phosphor coated with a diamond-like carbon film, wherein said diamond-like carbon film formed on a surface of said phosphor is in the form of a laminar shape.

* * * * *